United States Patent [19]

Horng

[11] 4,189,662
[45] Feb. 19, 1980

[54] SAFETY DEVICE FOR LAMPS OF MOTOR VEHICLE

[76] Inventor: Fu-Erh Horng, 116, Hi-Sun Fourth Rd., Hsaio-Kung Hsung, Kao-Hsiung Hsein, Taiwan

[21] Appl. No.: 904,614

[22] Filed: May 10, 1978

[51] Int. Cl.² .......................................... H05B 37/03
[52] U.S. Cl. ..................... 315/136; 315/77; 315/133; 315/135; 340/79; 340/85; 340/643
[58] Field of Search ................. 315/77, 80, 129, 131, 315/132, 135, 136, 191, 193; 340/52 B, 69, 71, 79, 85, 641, 643

[56] References Cited

U.S. PATENT DOCUMENTS

| | | | |
|---|---|---|---|
| 1,574,513 | 2/1926 | Ratliff et al. | 340/79 |
| 2,486,599 | 11/1949 | Hollins | 340/79 |
| 3,370,199 | 2/1968 | Kabriel | 340/79 X |

Primary Examiner—Eugene R. LaRoche

[57] ABSTRACT

An improved safety device comprises a plurality of checking lights connected with the lamps of the automobile in series, a plurality of indicating lights adapted to an amplifier circuit and a magnetic induction coil, in which, the brightening or extinguishing of the checking lights may be shown to correspond to the extinguishing or brightening of the lamps of the automobile, so that the drivers can easily judge which one of the lamps is damaged.

1 Claim, 2 Drawing Figures

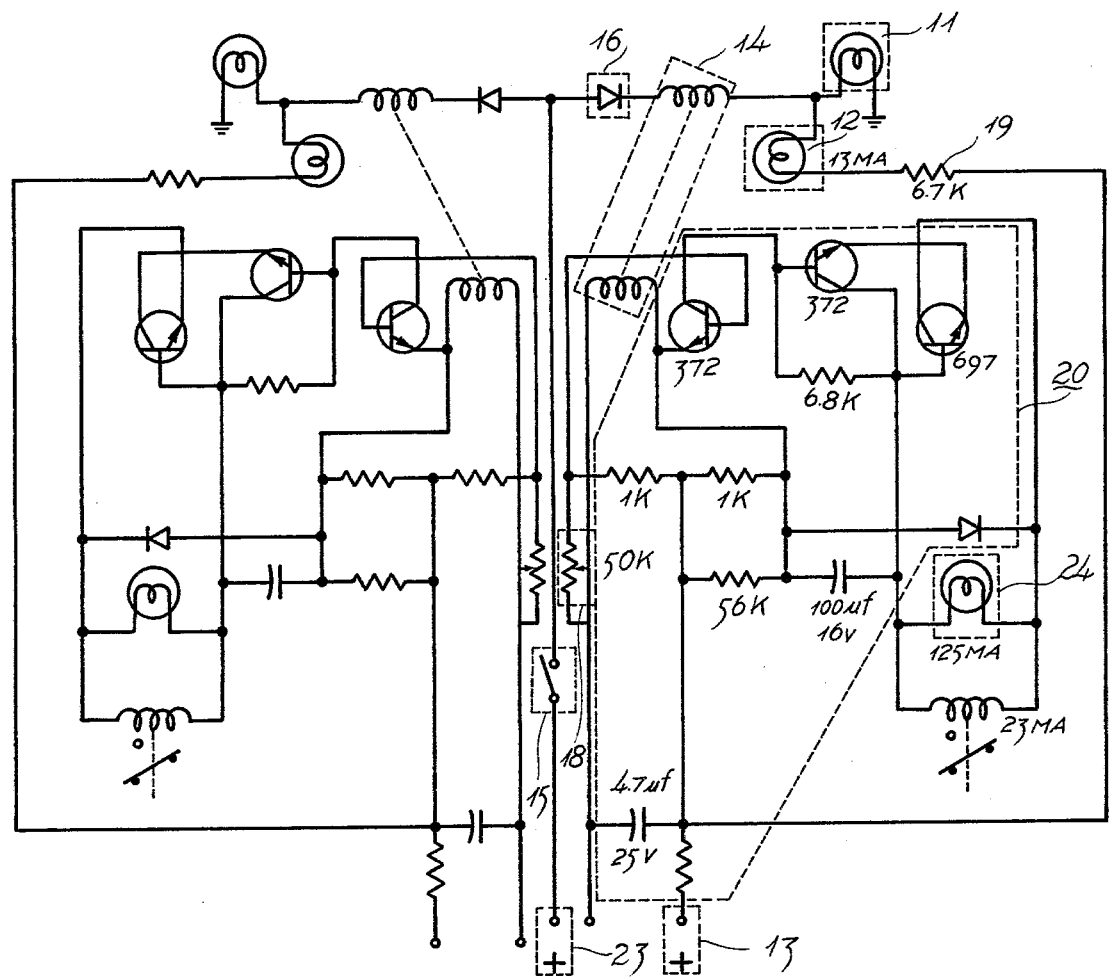
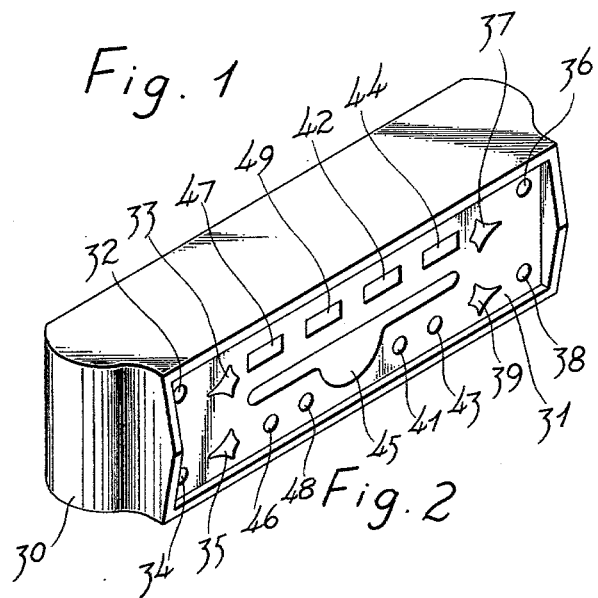
Fig. 1
Fig. 2

SAFETY DEVICE FOR LAMPS OF MOTOR VEHICLE

BACKGROUND OF THE INVENTION

1. Field of the Invention

This invention relates to an improved safety device to indicate lamps of a motor vehicle whether being brokendown or not, and more particularly, to a safety device mounted on an interior panel from which the driver can easily check the condition of the lamps.

2. Description of the Prior Art

In recent thirty years, motor vehicles have become essential in human living, there are many types of vehicles developed which are well-known in the art, all of the well-known motor vehicles are equipped with turn-signal lamps, stop lamps and headlamps, etc., on the body for warning the drivers in other vehicles so as to avoid any traffic accident, although most of th well-known automobiles are provided with an indicating device mounted on an interior panel for indicating which lamp is operated, however, the driver can not find out the lamps whether being brokendown or not from this indicating device, so that the possibility of accident is still not reduced.

SUMMARY OF THE PRESENT INVENTION

Accordingly, the purpose of this invention is to overcome the disadvantages described above.

A main object of the present invention is to provide a safety device comprising several indicating lights representing the lamps of the automobile respectively, and several checking lights, each light corresponds to one of the indicating lights.

A further object of the present invention is to provide a safety device mounted on an interior panel so as to be easily checked by the driver.

Consequently, according to this invention, a new and improved safety device mounted on an interior panel comprises several checking lights connected with the lamps of the automobile in series, several indicating lights adapted to an amplifier circuit and an magnetic induction coil, in which, the brightening or extinguishing of the checking lights may be shown to correspond to the extinguishing or brightening of the lamps of the automobile, so that the driver can easily judge which one of the lamps is damaged.

These and other objects of the invention will become more apparent hereinafter and will be more particularly pointed out in the appended claims. A preferred embodiment of the present invention will now be described in connection with the accompanying drawings in which:

FIG. 1 is an electrical diagram of an embodiment of the present invention; and

FIG. 2 is a perspective view of an embodiment of the present invention.

Referring now to FIG. 1, there is an electrical block diagram of a preferred embodiment according to the invention and which is used to illustrate, by way of example, the relationship among the stop lamps, stop indicating lights, and the stop checking lights during the brake operation.

The electrical block diagram is shown in FIG. 1, there is two identical parts and each one represents circuit of one side of the stop lamp, checking light and indicating light of the automobile, for the sake of brevity, only the right part will be described in detail in this specification.

One of terminals of a right stop lamp 11 (30 watt) is grounded, and the other terminal of the stop lamp 11 is connected, in series with a checking light 12 (0.3 watt), and then, through a resistor 19 having a relative large resistane (6.7 kilo ohm) to a positive potential 13 so as to form a main circuit. The electric petential of the right stop lamp 11 is greater than that of the stop checking light 12, therefore, in the normal condition (when switch 15 of the brake is off), the checking light 12 is kept in brightening condition and the stop lamp 11 is kept in extinguishing condition.

Furthermore, the stop lamp 11 is also connected in series with primary coil of a current transformer 14 through a rectifier 16, to the switch 15 of the brake and to another positive potential 23. Secondary coil of the current transformer 14 is connected to a amplifier circuit 20 which is designed to adapt with variable resistor 18 so as to make a stop-indicating light 24 brighten or extinguish to make it correspond to the closing or opening condition of switch 15 of the brake respectively. This amplifier circuit 20 is of a well-known type which is not described in detail here.

Referring to FIG. 2 which shows a perspective view of an indicating box 30 of the preferred embodiment. This indicating box 30 may be mounted on a proper place in the automobile to enable the driver to check the lights easily. As best shown in FIG. 2, the indicating box 30 has a panel 31 having a horizontal dividing strip 45 outwardly extending as far as a pair of turn-signal indicating lights 33, 35, 37, 39 positioned adjacent to the sides of the panel 31. Situated at the corners of the panel 31 are turn-signal checking lights 32, 34, 36, 38, each of said lights corresponds to one of the turn-signal indicating lights. These turn-signal indicating lights 33, 35, 37, 39 represent the front and rear turn-signal lamps of the automobile respectively.

There are two stop-indicating lights 42, 44 and two tail-indicating lights 47, 49 provided at the upper portion of said panel 31, and two stop-checking lights 41, 43 and two tail-checking lights 46, 48 provided at the lower portion of said panel 31.

In normal condition, switch 15 is off, a current will flow from the positive potential 13 through checking-light 12, resistor 19, lamp 11 of the automobile and to the ground thereby to switch on a main circuit and to make the checking-light 12 brighten. When the tungsten wire of the lamp 11 is damaged, the main circuit will be open circuit, in other words, the checking-light 12 is extinguished then, so that the driver can easily knows that the lamp 11 is brokendown.

When the switch 15 is on, a current will flow from another positive potential 23 through the rectifier 16, the primary coil of the current transformer 14, lamp 11 of the automobile and to the ground thereby to switch on another circuit and to make the lamp 11 bright and the checking light 12 extinguished, in the meantime, the secondary coil of the current transformer 14 will be inductioned and then, an inductioned current will be amplified by the amplifier circuit 20 to brighten the indicating light 24. In other words, when the lamp 11 is brightened, the indicating-light 24 will also be brightened and the checking light 12 will be extinguished, so that if the switch 15 is damaged, the lamp 11 and the indicating-light 24 will not be brightened, and the checking-light 12 will not be extinguished, hence, to enable the driver to know the switch 15 is brokendown and he can get it repaired in time.

What is claimed is:

1. A safety device for indicating the operating conditions of signal lights and switches, comprising:
   a plurality of circuit elements forming a first circuit path through one of the signal lights and one of the switches, said plurality of circuit elements including a primary winding of a current transformer coupled to one side of said one signal light and a rectifying diode in series with said one light, said primary winding, said one switch and a current source;
   a second plurality of circuit elements forming a second circuit path through said one light, said second plurality of circuit elements including a checking light connected to said one side of said one signal light, a resistor, and a second current source in series with said one signal light and said checking light, said checking light having a higher resistance than said one signal light, whereby when said one switch is open, current flows through said second circuit path and causes said checking light to glow visibly if said one signal light is in operating condition;
   a secondary winding magnetically coupled to said primary winding;
   an amplifier circuit coupled to said secondary winding for amplifying current in said secondary winding; and
   an indicator light coupled to the output of said amplifier, such that current flowing through said first circuit path induces a current in said secondary winding and causes said indicator light to glow visibly;
   whereby if both said one signal light and said one switch are operational, said checking light will glow when said switch is open and said indicating light and said one signal light will glow when said one switch is closed, and if said one signal light is not operational, none of the said lights will glow, and if said one signal light is operational and said one switch is not operational, said checking light will glow continuously.

* * * * *